(12) United States Patent
Hirano et al.

(10) Patent No.: US 12,215,533 B2
(45) Date of Patent: Feb. 4, 2025

(54) VEHICLE SIDE STRUCTURE

(71) Applicant: Honda Motor Co., Ltd., Tokyo (JP)

(72) Inventors: Eiji Hirano, Saitama (JP); Takayuki Soma, Saitama (JP); Masahiro Tanigawa, Saitama (JP); Takeshi Abe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 268 days.

(21) Appl. No.: 17/883,622

(22) Filed: Aug. 9, 2022

(65) Prior Publication Data

US 2023/0083306 A1 Mar. 16, 2023

(30) Foreign Application Priority Data

Sep. 16, 2021 (CN) .......................... 202111085717.7

(51) Int. Cl.
*B60J 5/04* (2006.01)
*B60J 1/17* (2006.01)
*E05F 15/689* (2015.01)

(52) U.S. Cl.
CPC .............. *E05F 15/689* (2015.01); *B60J 1/17* (2013.01); *B60J 5/0468* (2013.01); *B60J 5/0425* (2013.01); *B60J 5/0427* (2013.01); *E05Y 2201/434* (2013.01); *E05Y 2600/46* (2013.01); *E05Y 2600/60* (2013.01); *E05Y 2900/55* (2013.01)

(58) Field of Classification Search
CPC ..... B60J 1/17; B60J 5/0419; B60J 5/06; B60J 5/0468; B60J 5/0425; B60J 5/0427; B60J 5/0443; B60J 5/0456; B60J 5/0461; E05F 15/689; E05Y 2900/531

USPC .................................. 296/146.2, 146.6, 155
See application file for complete search history.

(56) References Cited

U.S. PATENT DOCUMENTS

| | | | |
|---|---|---|---|
| 6,205,714 B1* | 3/2001 | Staser | B60J 5/0429 49/502 |
| 6,746,072 B1* | 6/2004 | Romesburg | B60S 1/583 296/96.17 |
| 9,475,366 B2* | 10/2016 | Faruque | B60J 5/0458 |
| 2006/0000145 A1* | 1/2006 | Yoshida | B60J 5/06 49/360 |
| 2013/0168997 A1* | 7/2013 | Kurokawa | B60J 5/0427 296/146.6 |
| 2014/0117706 A1* | 5/2014 | Fortin | B60J 5/0418 296/146.16 |
| 2015/0314808 A1* | 11/2015 | Jenkins | B60J 5/0461 296/187.12 |
| 2018/0029646 A1* | 2/2018 | Kanagai | B60J 5/0461 |
| 2021/0207415 A1* | 7/2021 | Marega | E05D 15/0686 |
| 2023/0083306 A1* | 3/2023 | Hirano | B60J 5/0468 49/349 |

FOREIGN PATENT DOCUMENTS

JP 2009023573 2/2009

\* cited by examiner

*Primary Examiner* — Gregory A Blankenship
(74) *Attorney, Agent, or Firm* — JCIPRNET

(57) ABSTRACT

The disclosure provides a vehicle side structure. The vehicle side structure is for being mounted near a door, and includes: an electric motor disposed inside the door to drive a door glass up and down; a fitting member, fitting the door and a vehicle body; and a connecting member, connecting the fitting member and the electric motor.

6 Claims, 2 Drawing Sheets

VEHICLE SIDE STRUCTURE

CROSS-REFERENCE TO RELATED APPLICATION

This application claims the priority benefits of China application no. 202111085717.7, filed on Sep. 16, 2021. The entirety of the above-mentioned patent application is hereby incorporated by reference herein and made a part of this specification.

BACKGROUND

Technical Field

The disclosure relates to a vehicle side structure.

Related Art

In the prior art, as a vehicle side structure mounted near a door, a door glass may be provided near the door, and a guide rail may be provided to guide the lifting of the door glass. Here, a connecting plate is provided at a lower end of the guide rail, and the door and the connecting plate are fitted via a fitting pin serving as a fitting member. However, in such a vehicle side structure, since the fitting pin as the fitting member is connected to a high-rigidity connecting plate, when an impact load from outside the vehicle acts on the guide rail via a door beam, the lower end of the guide rail is displaced to the outside of the vehicle, such that the fitting pin as the fitting member is also easily displaced to the outside of the vehicle, and thus there is a concern that it will be disengaged from the door and a side sill which is a part of a vehicle body.

CITATION LIST

Patent Literature

[Patent Literature 1] Japanese Patent Laid-Open No. 2009-23573

The disclosure provides a vehicle side structure capable of preventing a fitting member from being displaced and disengaged when receiving a load from outside the vehicle.

SUMMARY

The disclosure provides a vehicle side structure for being mounted near a door. The vehicle side structure includes: an electric motor, disposed inside the door, to drive a door glass up and down; a fitting member, fitting the door and a vehicle body; and a connecting member, connecting the fitting member and the electric motor.

BRIEF DESCRIPTION OF THE DRAWINGS

In order to make the above features and advantages of the disclosure more obvious and easy to understand, the following is a detailed description of the embodiments, together with the accompanying drawings, as follows.

DESCRIPTION OF THE EMBODIMENTS

Figure 1:
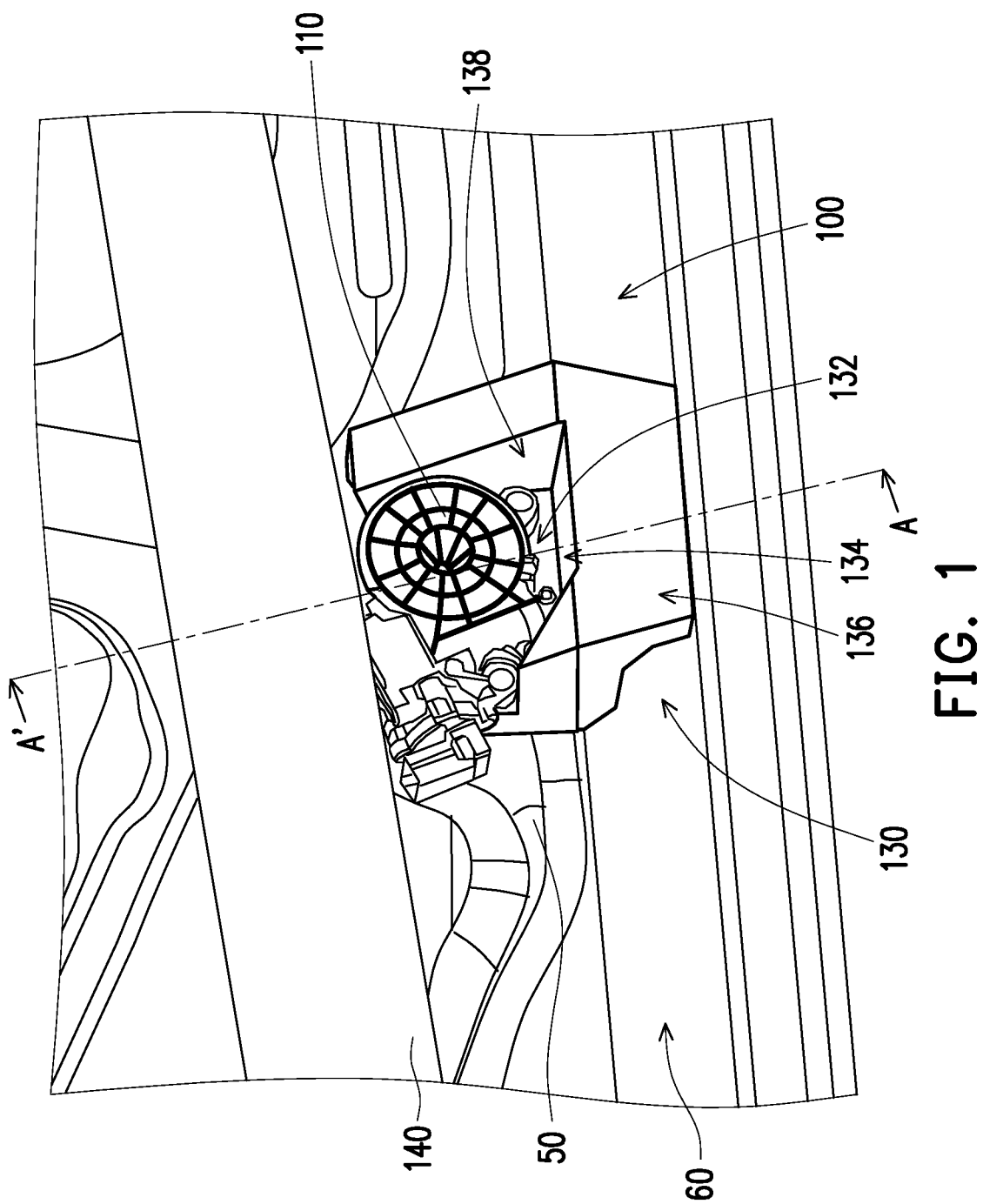
FIG. 1 is a schematic perspective diagram of a vehicle side structure according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like parts.

Figure 2:
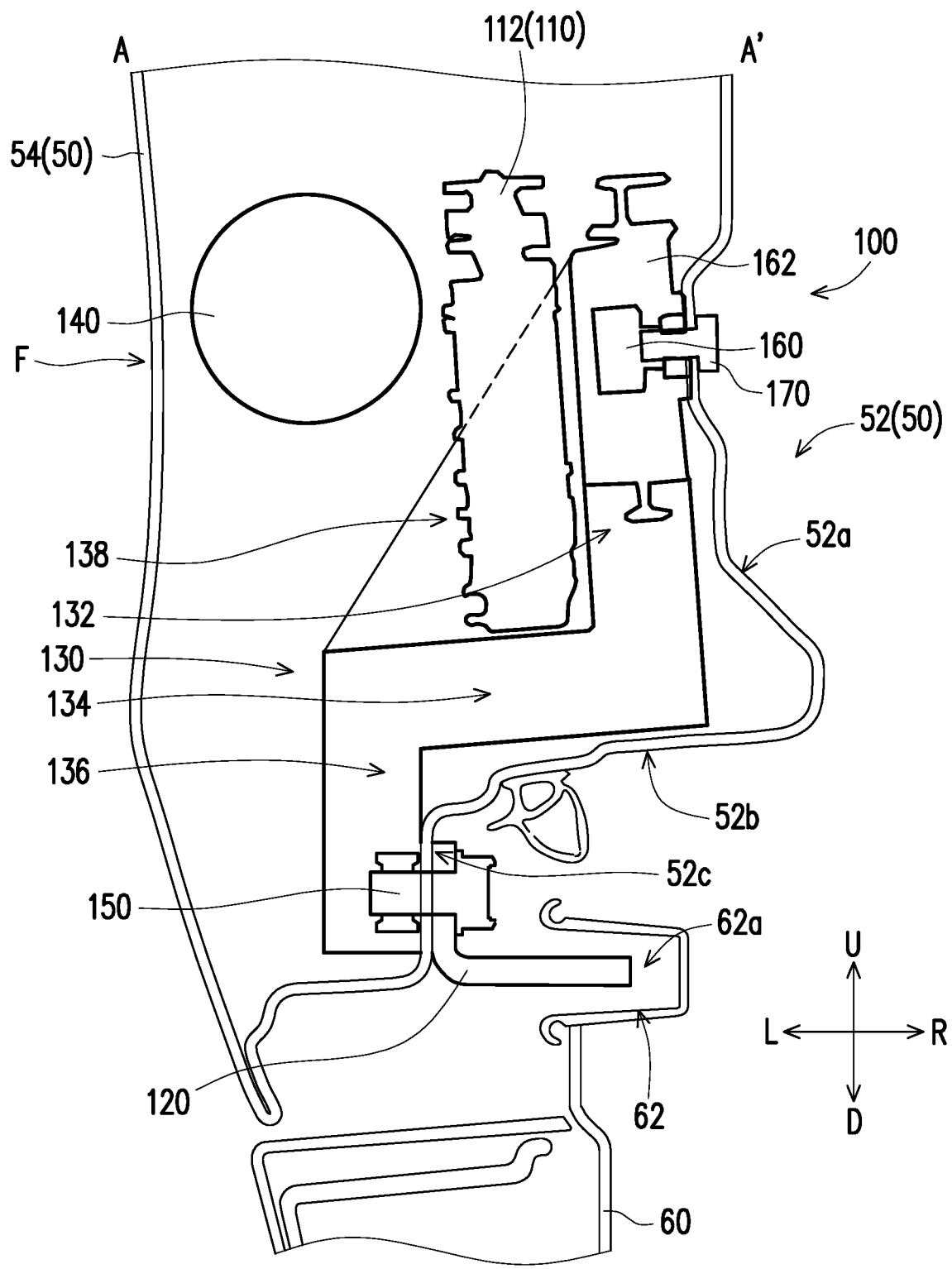
FIG. 2 is a schematic cross-sectional diagram along line A-A' of the vehicle side structure shown in FIG. 1.

FIG. 1 is a schematic perspective diagram of a vehicle side structure according to an embodiment of the disclosure, and FIG. 2 is a schematic cross-sectional diagram along line A-A' of the vehicle side structure shown in FIG. 1. The specific structure and the like of a vehicle side structure 100 of this embodiment will be described below with reference to FIGS. 1 and 2, but the vehicle side structure 100 of this embodiment is only one example of the disclosure, and the disclosure is not limited thereto.

Referring to FIGS. 1 and 2, in this embodiment, the vehicle side structure 100 is for being mounted near a door 50, for example, between the door 50 located on the side of the vehicle and a vehicle body 60 located inside the vehicle, and is adjacent to a door glass (not shown) mounted inside the door 50. The vehicle side structure 100 includes an electric motor 110, a fitting member 120, and a connecting member 130. The electric motor 110 is disposed inside the door 50 to drive the door glass to move up and down. The fitting member 120 (shown in FIG. 2) fits the door 50 to the vehicle body 60. The connecting member 130 connects the fitting member 120 and the electric motor 110. However, the disclosure does not limit the application of the vehicle side structure 100 on the vehicle and the specific structure thereof. For example, the presence or absence of the guide rails in the prior art may be adjusted according to requirements, and the disclosure is not limited thereto.

In detail, in this embodiment, as shown in FIG. 2, the door 50 includes a door inner panel 52 and a door outer panel 54. The door inner panel 52 and the door outer panel 54 are connected to each other, and an inner space is formed. Therefore, the vehicle side structure 100 may be mounted in the inner space between the door inner panel 52 and the door outer panel 54 while being hidden inside the door 50. Moreover, at a lower end of the door 50, the fitting member 120 is connected to the door inner panel 52 via a fixing member 150 (e.g. a bolt), and the fitting member 120 is fitted into a recess 62a formed in a side sill 62 of the vehicle body 60, thereby connecting the door inner panel 52 and a part of the vehicle body 60 (e.g. the side sill 62). That is, the fitting member 120 fits the door 50 to the vehicle body 60, thereby restricting the displacement of the door 50. However, the disclosure is not limited thereto, and may be adjusted according to requirements.

Furthermore, in this embodiment, the door inner panel 52 includes a first surface 52a extending downward (e.g. a vehicle downward direction D) along a vehicle up-down direction (a vehicle upward direction U and the vehicle downward direction D in FIG. 2), a second surface 52b extending from the first surface 52a outward (e.g. a vehicle left direction L) along a vehicle width direction (the vehicle left direction L and a vehicle right direction R in FIG. 2), and a third surface 52c extending downward from the second surface 52b in the vehicle up-down direction. That is, the door inner panel 52 is formed in a stepped shape. The above-mentioned extension along the vehicle up-down direction or along the vehicle width direction serves to describe the relative position of each surface, and does not limit each surface to be a plane or to extend in a linear direction and be perpendicular to each other. Each surface may also be a surface with a concave-convex shape or slightly inclined; the disclosure is not limited thereto.

Further, in this embodiment, as shown in FIG. 2, the electric motor 110 is mounted on the first surface 52a. Between the electric motor 110 and the first surface 52a, a lifting mechanism (not shown) for performing the lifting and lowering of the door glass and a guide rail 160 for guiding the lifting and lowering of the door glass are further provided. Although the electric motor 110 and the guide rail 160 are shown as being separated from each other in the cross section of FIG. 2, the electric motor 110 and the guide rail 160 are actually an integrated structure. Therefore, the electric motor 110 may be mounted on the first surface 52*a* via a housing 162 of the guide rail 160. Moreover, although a fixing member 170 (e.g. a bolt) is shown as penetrating the guide rail 160 in the cross section of FIG. 2, in fact the fixing member 170 does not penetrate into the guide rail 160 and is staggered from the guide rail 160. In other cross sections not shown, the fixing member 170 penetrates the electric motor 110, thereby fixing the electric motor 110 to the first surface 52*a*. However, the disclosure is not limited thereto, and may be adjusted according to requirements.

Further, in this embodiment, as shown in FIG. 2, the fitting member 120 is mounted on the third surface 52*c*. The fitting member 120 is connected to the door inner panel 52 via the fixing member 150, and the fitting member 120 is fitted into the recess 62*a* formed in the side sill 62 of the vehicle body 60. Thereby, the connecting member 130 is mounted near the door inner panel 52 and spans across the first surface 52*a* to the third surface 52*c*, to connect the electric motor 110 mounted on the first surface 52*a* and the fitting member 120 mounted on the third surface 52*c*, and correspond to the stepped shape of the door inner panel 52 (i.e. the first surface 52*a* to the third surface 52*c*), but the disclosure is not limited thereto.

Therefore, in this embodiment, at the lower end of the connecting member 130 corresponding to the third surface 52*c*, the fixing member 150 for mounting the fitting member 120 to the third surface 52*c* of the door inner panel 52 further penetrates into the connecting member 130. Correspondingly, although the electric motor 110 and the connecting member 130 are shown as being separated from each other in the cross section of FIG. 2, in other cross sections not shown, the connecting member 130 is connected to a housing 112 of the electric motor 110 at an upper end of the connecting member 130 corresponding to the first surface 52*a*. Preferably, the connecting member 130 is integrally formed with the housing 112 of the electric motor 110. However, the disclosure is not limited thereto, and may be adjusted according to requirements.

Furthermore, in this embodiment, as shown in FIG. 2, the connecting member 130 includes a first portion 132 disposed along the first surface 52*a*, a second portion 134 disposed along the second surface 52*b*, and a third portion 136 disposed along the third surface 52*c*. Disposition along the surface serves to illustrate the relative position of each portion and each surface, and does not limit each portion and each surface to be parallel to each other or to fit each other, as long as their extension directions correspond; the disclosure is not limited thereto. As a result, the connecting member 130 is formed in a stepped shape similar to the door inner panel 52, such that the fitting member 120 and the electric motor 110 may be connected closely to the door inner panel 52, but the disclosure is not limited thereto.

Moreover, in this embodiment, since the connecting member 130 is formed in a stepped shape and includes the first portion 132, the second portion 134, and the third portion 136, an area open to the outside is formed between the first portion 132 and the second portion 134, so preferably, the connecting member 130 includes a vertical wall 138 connecting the first portion 132 and the second portion 134. The vertical wall 138 is, for example, a rib-like or beam-like structure, and may extend obliquely from an upper end portion of the first portion 132 to an outer end of the second portion 134, but the disclosure is not limited thereto.

Furthermore, in this embodiment, as shown in FIG. 2, the vehicle side structure 100 may further include a door beam 140. The door beam 140 is disposed inside the door 50 and faces the electric motor 110. That is, the door beam 140 is disposed in the inner space between the door inner panel 52 and the door outer panel 54, and faces the electric motor 110 mounted on the first surface 52*a* of the door inner panel 52. Therefore, the door beam 140 is located between the door outer panel 54 and the electric motor 110, and substantially corresponds to the electric motor 110 and the first surface 52*a* of the door inner panel 52 in the height direction. However, the disclosure is not limited to this, and may be adjusted according to requirements.

Thus, it can be seen that in this embodiment, since the vehicle side structure 100 uses the connecting member 130 to connect the fitting member 120 and the high-rigidity electric motor 110, when an impact load from outside the vehicle (arrow F in FIG. 2) acts on the door 50, even if the door 50 is deformed by the load from outside the vehicle, the load may be dispersed via the connecting member 130. Thus, the fitting member 120 connected to the high-rigidity electric motor 110 via the connecting member 130 is less likely to be displaced to the outside of the vehicle (e.g. in the vehicle left direction L in FIG. 2), thereby preventing the fitting member 120 from disengaging. Accordingly, the vehicle side structure 100 can prevent the fitting member 120 from being displaced and disengaged when receiving a load from outside the vehicle.

Furthermore, in this embodiment, the vehicle side structure 100 further includes the door beam 140, which is disposed facing the electric motor 110 and roughly corresponding to the electric motor 110 and the first surface 52*a* of the door inner panel 52 in the height direction. Therefore, when an impact load from outside the vehicle (arrow F in FIG. 2) acts on the door 50, the door beam 140 abuts against the high-rigidity electric motor 110 while receiving the load from outside the vehicle. Thereby, the load applied to the door beam 140 may be distributed to the side sill 62 of the vehicle body 60 via the connecting member 130 and the fitting member 120 connected to the high-rigidity electric motor 110, thereby suppressing deformation of the door 50. At this time, since the electric motor 110 and the fitting member 120 are connected to each other, and the load may be dispersed via the connecting member 130, such that the electric motor 110, which is abutted by the door beam 140, can be prevented from being displaced to the inside of the vehicle (e.g. in the vehicle right direction R in FIG. 2).

Moreover, in this embodiment, the door inner panel 52 is formed in a stepped shape and includes the first surface 52*a*, the second surface 52*b*, and the third surface 52*c*, and the connecting member 130 is formed in a stepped shape and includes the first portion 132, the second portion 134, and the third portion 136. Therefore, when an impact load from outside the vehicle (arrow F in FIG. 2) acts on the door 50, even if the door inner panel 52 is pressed by the door beam 140 toward the inside of the vehicle (the vehicle right direction R in FIG. 2) on the first surface 52*a* corresponding to the door beam 140 and the electric motor 110, and receives the aforementioned load, the second surface 52*b* is provided with the second portion 134 (i.e. the stepped shape of the connecting member 130) extending along the second surface 52*b* of the door inner panel 52 and is not easily deformed. Thereby, the fitting member 120 mounted on the third surface 52c can be prevented from being displaced and disengaged from the door 50 and the vehicle body 60.

Furthermore, in this embodiment, since the connecting member 130 is formed in a stepped shape and further provided with the vertical wall 138 connecting the first portion 132 and the second portion 134, when an impact load from outside the vehicle (arrow F in FIG. 2) acts on the door 50, even if the fitting member 120 mounted on the third portion 136 receives a load to the outside of the vehicle (e.g. in the vehicle left direction L in FIG. 2), the vertical wall 138 located between the first portion 132 and the second portion 134 receives the load as a compressive load (i.e. the load is applied in a manner of compression toward an area between the first portion 132 and the second portion 134). Thereby, the deformation of the third portion 136 can be reduced, and the disengagement of the fitting member 120 can be prevented.

Moreover, in this embodiment, since the connecting member 130 is formed integrally with the housing 112 of the electric motor 110, the number of portions can be reduced. Further, since the housing 112 of the electric motor 110 is generally made of a material with high rigidity, the connecting member 130 formed integrally with the housing 112 is also constituted as a member with high rigidity. Thereby, the disengagement of the fitting member 120 can be prevented more effectively. However, the connecting member 130 and the housing 112 of the electric motor 110 may also be manufactured separately and then fixed. The disclosure is not limited thereto, and may be adjusted according to requirements.

In summary, in the vehicle side structure of the disclosure, the electric motor is disposed inside the door to drive the door glass to move up and down, the fitting member fits the door and the vehicle body, and the connecting member connects the fitting member and the electric motor. Preferably, the vehicle side structure further includes a door beam, which abuts against the electric motor when receiving a load from outside the vehicle, and the connecting member is disposed having a stepped shape (i.e. the first portion, the second portion, and the third portion) to transfer loads from outside the vehicle. In this way, compared to the prior art in which the fitting member is connected to a low-rigidity connecting plate, in the vehicle side structure of the disclosure, the fitting member and the high-rigidity electric motor are connected by the connecting member, and when an impact load from outside the vehicle acts on the door, the fitting member connected to the high-rigidity electric motor via the connecting member is not easily displaced, and disengagement of the fitting member can be prevented. Accordingly, the vehicle side structure of the disclosure can prevent the fitting member from being displaced and disengaged when receiving a load from outside the vehicle.

In an embodiment of the disclosure, the vehicle side structure further includes: a door beam, disposed inside the door and facing the electric motor so as to abut against the electric motor when receiving a load from outside the vehicle.

In an embodiment of the disclosure, the door includes a door inner panel. The door inner panel includes a first surface extending downward in a vehicle up-down direction, a second surface extending outward in a vehicle width direction from the first surface, and a third surface extending downward in the vehicle up-down direction from the second surface. The electric motor is mounted on the first surface. The fitting member is mounted on the third surface. The connecting member includes a first portion disposed along the first surface, a second portion disposed along the second surface, and a third portion disposed along the third surface.

In an embodiment of this disclosure, the connecting member includes a vertical wall connecting the first portion and the second portion.

In an embodiment of the disclosure, the connecting member is integrally formed with a housing of the electric motor.

Based on the above, in the vehicle side structure of the disclosure, the electric motor is disposed inside the door to drive the door glass to move up and down, the fitting member fits the door and the vehicle body, and the connecting member connects the fitting member and the electric motor. In this way, compared with the prior art in which the fitting member is connected to a high-rigidity connecting plate, in the vehicle side structure of the disclosure, the fitting member and the electric motor having high rigidity are connected by the connecting member, and when an impact load from outside the vehicle acts on the door, the fitting member connected to the high-rigidity electric motor via the connecting member is not easily displaced, and disengagement of the fitting member can be prevented. Accordingly, the vehicle side structure of the disclosure can prevent the fitting member from being displaced and disengaged when receiving a load from outside the vehicle.

Finally, it should be noted that the above embodiments are only used to illustrate the technical solutions of the disclosure, but not to limit them; although the disclosure has been described in detail with reference to the foregoing embodiments, those of ordinary skill in the art should understand that: it is still possible to modify the technical solutions described in the foregoing embodiments, or perform equivalent replacements to some or all of the technical features; however, these modifications or substitutions do not make the essence of the corresponding technical solutions deviate from the scope of the technical solutions of the embodiments of the disclosure.

What is claimed is:

1. A vehicle side structure for being mounted near a door, the vehicle side structure comprising:
   an electric motor, disposed inside the door, to drive a door glass up and down;
   a fitting member, fitting the door and a vehicle body;
   a connecting member, connecting the fitting member and the electric motor;
   a door beam, disposed inside the door and facing the electric motor in a position overlapping with the motor in a side view of a vehicle so as to abut against the electric motor when receiving a load from outside the vehicle.

2. A vehicle side structure for being mounted near a door, the vehicle side structure comprising:
   an electric motor, disposed inside the door, to drive a door glass up and down;
   a fitting member, fitting the door and a vehicle body; and
   a connecting member, connecting the fitting member and the electric motor,
   wherein the door comprises a door inner panel, the door inner panel having a first surface extending downward in a vehicle up-down direction, a second surface extending outward in a vehicle width direction from the first surface, and a third surface extending downward in the vehicle up-down direction from the second surface;
   the electric motor is mounted on the first surface;
   the fitting member is mounted on the third surface; and the connecting member comprises a first portion disposed along the first surface, a second portion disposed along the second surface, and a third portion disposed along the third surface.

3. The vehicle side structure according to claim 1, wherein the door comprises a door inner panel, the door inner panel having a first surface extending downward in a vehicle up-down direction, a second surface extending outward in a vehicle width direction from the first surface, and a third surface extending downward in the vehicle up-down direction from the second surface;

the electric motor is mounted on the first surface;

the fitting member is mounted on the third surface; and the connecting member comprises a first portion disposed along the first surface, a second portion disposed along the second surface, and a third portion disposed along the third surface.

4. The vehicle side structure according to claim 2, wherein the connecting member comprises a vertical wall connecting the first portion and the second portion.

5. The vehicle side structure according to claim 3, wherein the connecting member comprises a vertical wall connecting the first portion and the second portion.

6. The vehicle side structure according to claim 1, wherein the connecting member is integrally formed with a housing of the electric motor.

\* \* \* \* \*